United States Patent Office 3,663,614
Patented May 16, 1972

3,663,614
METHOD OF MAKING TRIMETHYLUREA
Kenneth C. Rennells, Whitehall, Mich., assignor to The Ott Chemical Company
No Drawing. Filed Feb. 19, 1969, Ser. No. 800,756
Int. Cl. C07c *127/18*
U.S. Cl. 260—553 R  6 Claims

ABSTRACT OF THE DISCLOSURE

Covers a method of making trimethylurea by heating a tetramethylurea salt at a sufficient temperature to cleave said salt, thereby forming said trimethylurea, which is recovered.

---

Trimethylurea possesses unique solubilization characteristics, and is particularly useful as a high temperature solvent. However, this particular chemical is relatively expensive in that its starting materials, methyl isocyanate and dimethylamine, particularly the former, are relatively expensive. On the other hand, the symmetrical urea, tetramethylurea usually made from phosgene and dimethylamine is less expensive in a relative sense due to the lower cost of the phosgene reactant compared to the methyl isocyanate reactants used in making the unsymmetrical urea.

It would be a distinct advance in the art if trimethylurea could be somehow made from tetramethylurea, which overall process would materially lower the cost of trimethylurea compared to the just-mentioned prior art method.

It therefore becomes an object of the invention to provide a unique method of making trimethylurea.

A specific object of the invention is to produce trimethylurea through use of tetramethylurea as a reactant.

A still further object of the invention is to make trimethylurea in good yields in a simple, yet novel method which involves only conventional equipment, and can be carried out in a relatively short time.

Other objects will appear hereinafter.

In accordance with the invention, a method of making trimethylurea has been discovered. In its broadest aspects the procedure involves the steps of heating a tetramethylurea salt at a sufficient temperature to cleave said salt, thereby forming said trimethylurea. The trimethylurea is then recovered form the reaction mass.

It should be noted at this time that the above cleavage reaction was entirely unexpected. In the first place tetramethylurea readily forms salts with acids such as hydrochloric acid. It would then be expected that the reaction would be thermally reversible; that is, upon heating the tetramethylurea salt, the acid moiety would be driven off leaving behind the high boiling tetramethylurea. Yet, as just noted, under proper conditions of heat the symmetrical tetramethylurea is cleaved to form the unsymmetrical trimethylurea. The trimethylurea is formed in good yields in the reaction and only small amounts of by-products such as olefins, etc. are formed. Normally, it would also be expected that in a high temperature cleavage reaction substantial amounts of by-products of this type would be formed. Such is not the case here.

By far the most useful starting material in the invention is the hydrochloric acid salt of tetramethylurea. Utilizing such material a second useful product can be attained in addition to the triemthylurea, namely, methyl chloride. During the reaction the methyl chloride is driven off and can be collected via conventional means. This product has also found wide use as an article of commerce, and thus since both products of methyl chloride and trimethylurea are useful, the overall process is even more attractive from a commercial standpoint.

The cleavage reaction is usually carried out at a relatively high temperature, and more often is carried out at a temperature ranging from about 150° C. to 250° C. Most often the temperature range involved in splitting the tetramethylurea salt reactant is 160° C.–1900 C.

The tetramethylurea salt, such as the hydrochloric acid salt may be heated as such or in presence of a solvent. Perhaps the best solvent in the reaction of this type is tetramethylurea itself, since tetramethylurea being a high boiling solvent is not driven off during the cleavage. However, other high boiling organic solvents may be used with equal facility including methoxybenzene, o-dichlorobenzene, Decalin, xylene, toluene, naphthalene, naphthas, etc.

The time of reaction will usually vary from a few hours up to about 24 hours or more. The total duration of the reaction will depend, of course, upon the temperature involved.

As noted above, tetramethylurea is best formed by reacting phosgene and dimethylamine. In a greatly preferred embodiment of the invention the herewith defined process beings with this reaction and continues on through in a continuous manner until the desired trimethylurea product is achieved. Thus, as an illustration, equimolar amounts of phosgene and dimethylamine are reacted in presence of tetramethylurea solvent. The tetramethylurea solvent is usually present in approximately one-half the molar amount of phosgene or dimethylamine. At the completion of this reaction there is then present approximately equal molar amounts of tetramethylurea and the hydrochloric acid salt of tetramethylurea. During the first step of the overall reaction the tetramethylurea not only acts as a solvent but also acts as an acid acceptor to form the hydrochloric acid salt thereof. The phosgene-dimethylamine reaction in turn yields tetramethylurea which may be reused as a solvent in repeating the just-mentioned sequence. This reaction mass is then heated within the aforementioned temperature range without isolation of the intermediate salt. As a result equimolar amounts of methyl chloride and trimethylurea are then formed, with tetramethylurea solvent remaining in about the same amount as was originally present. During the heating step the methyl chloride, of course, is driven off and collected, leaving behind trimethylurea and tetramethylurea. The tetramethylurea is then distilled off leaving behind the trimethylurea which may be purified in a conventional manner, if so desired.

The following example illustrates a typical mode of carrying out the process of the invention. This example, of course, is meant to be merely illustrative, and the invention is not to be limited thereto. All parts and percentages are by weight unless otherwise expressed.

EXAMPLE I 232.4 g. (2.0 moles) of tetramethylurea was charged to a flask and then 36.5 g. (1.0 mole) of hydrochloric acid gas was sparged in the flask. Thus, 1 mole of the tetramethylurea was put in hydrochloric acid salt form, with the remaining mole available to act as a solvent here.

The clear solution was then heated to reflux and held at reflux temperature (166° C.–186° C.) for about 14 hours. At the end of this time the weight loss of the reaction mass was 54.9 g. which closely corresponded to the theoretical weight loss of 50.5 g. due to driving off of methyl chloride.

Tetramethylurea was then distilled off in an amount of 133.6 g. (1.15 moles) leaving behind 79.2 g. of residue. The 79.2 g. of residue contained approximately 14.2 g. of dimethylamine hydrochloride (0.174 mole). Formation of the dimethylamine hydrochloride was caused by hydrolysis of the tetramethylurea due to presence of small quantities of water. The desired product trimethylurea was present in amount of 65 g. (0.635 mole). The trimethylurea sample had an M.P. of 71° C.–74° C. corresponding closely to its reported melting point. A mixed melting point and I.R. comparison to a known sample of trimethylurea confirmed that the trimethylurea had been synthesized in the reaction.

In a subsequent reaction hydrolysis was considerably diminished by running the reaction to the exclusion of moisture. In this case, very little dimethylamine hydrochloride by-product was formed.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein before set forth, and as fall within the scope of the invention.

The invention is hereby claimed as follows:

1. A method of making trimethylurea which comprises the steps of heating tetramethylurea hydrochloride at a temperature ranging from about 150° C. to about 250° C. to cleave said tetramethylurea hydrochloride thereby forming trimethylurea, and recovering said trimethylurea.

2. The method of claim 1 wherein said reaction is carried out in presence of a high boiling organic solvent.

3. The method of claim 2 wherein said solvent is tetramethylurea.

4. The method of claim 1 wherein said temperature range is 160° C. to 190° C.

5. A method of making trimethylurea which comprises the steps of reacting phosgene and dimethylamine in the presence of tetramethylurea to form a mixture of tetramethylurea and tetramethylurea hydrochloride, heating said mixture at a temperature ranging from about 150° C. to about 250° C. to cleave said tetramethylurea hydrochloride thereby forming trimethylurea, and recovering said trimethylurea.

6. The method of claim 5 wherein said tetramethylurea is recycled for repeated use as a solvent in said method.

References Cited

Franchimont Recueil Trav. Chim. Pays-Bas 3 (1884), pp. 226–227.

LEON ZITVER, Primary Examiner

M. W. GLYNN, Assistant Examiner

U.S. Cl. X.R.

260—652 R